Feb. 13, 1962 G. P. ENGSTRÖM 3,021,471
DIRECT VOLTAGE SYSTEM COMPRISING STATIC CONVERTERS
INTERCONNECTED THROUGH INTER-PHASE TRANSFORMERS
Filed Aug. 26, 1958
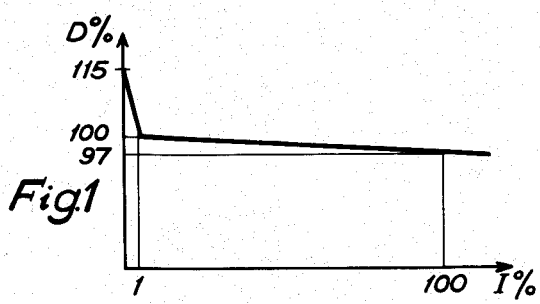
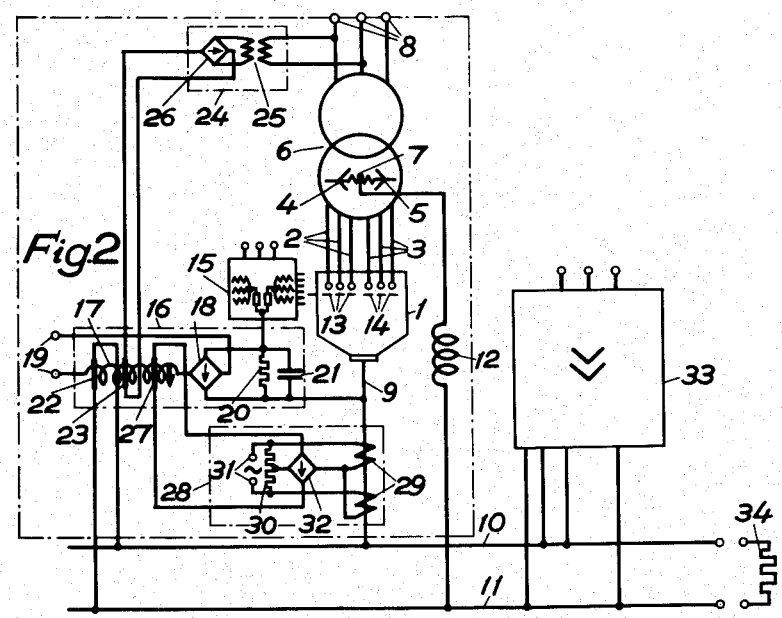
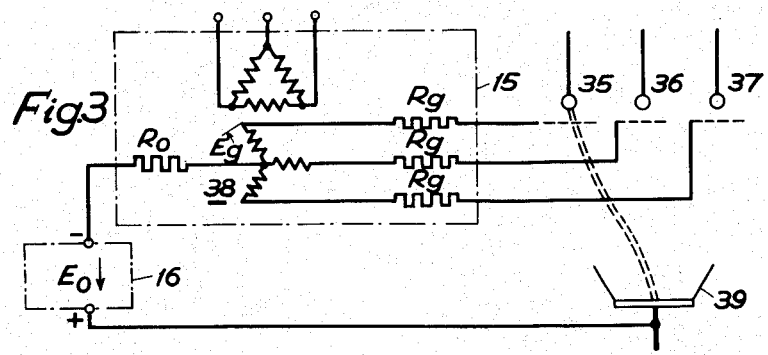
INVENTOR.
Gunnar P. Engström.
BY
Attorney.

United States Patent Office 3,021,471
Patented Feb. 13, 1962

3,021,471
DIRECT VOLTAGE SYSTEM COMPRISING STATIC CONVERTERS INTERCONNECTED THROUGH INTER-PHASE TRANSFORMERS
Gunnar P. Engström, Ludvika, Sweden, assignor to Allmanna Svenska Elektriska Aktiebolaget, Vasteras, Sweden, a corporation of Sweden
Filed Aug. 26, 1958, Ser. No. 757,313
Claims priority, application Sweden Aug. 31, 1957
10 Claims. (Cl. 321—19)

The present invention relates to a direct voltage system fed from grid controlled rectifiers consisting of commutating groups of discharge paths which are displaced in phase in relation to one another and have at least the pulse number 2 and are inter-connected through inter-phase transformers.

A direct voltage system which in its most usual form consists of two three-phase groups of discharge paths inter-connected through an inter-phase transformer has, during normal service, a direct voltage which in unsmoothed state is determined by the phase voltages of each three-phase group. As the inter-phase transformer constitutes a large inductance between the three phase groups, any commutation between anodes belonging to different groups is prevented. Across the inter-phase transformers an alternating voltage will appear which corresponds to the difference between the momentary values of the direct voltages of the two three-phase groups. This alternating voltage causes an excitating current through the inter-phase transformer and this current must be super-imposed upon the direct current floating through each separate three-phase group. Due to the unidirectional properties of the rectifier this composed current cannot, however, become negative, which would occur when the direct current component through one three-phase group becomes so low that it is smaller than the peak value of the excitating current of the inter-phase transformer. The value of the direct current at which this phenomenon occurs is usually called the critical one. If the excitating current of the inter-phase transformer is prevented in this way from flowing, the inter-phase transformer cannot take care of the voltage difference between the two commutating groups of discharge paths because of which commutation will start between anodes belonging to different groups. The rectifier then passes successively into six phase operation, which for an unloaded rectifier means a voltage increase of about 15%. The load range within which such an increase in voltage can arise is usually called the under-critical one.

The direct voltage system can however, also comprise several parallel working aggregates, each of which may be of the above described type. If the aggregates are thereby inter-connected through inductances and all secondary voltages of the separate rectifier transformers have different phase angles, a voltage rise can appear, even in this case, if the load current falls below a certain value, so that commutation starts between anodes belonging to separate aggregates.

The object of the present invention is to prevent a voltage rise of the above mentioned type in direct current systems of the type described above.

In accordance with the present invention the direct current system comprises a means, sensitive to the direct voltage and the alternating voltage of the system for blocking those of the commutating groups of discharge paths, the current of which temporarily becomes zero, when the direct voltage exceeds the no-load value, which during normal service corresponds to the alternating voltage of the commutating group.

The invention is applicable on different types of grid control but it is especially suitable for rectifiers with floating grids. Floating grid means that the potential of the unburning grids in relation to the cathode is determined by the voltage difference between these grids and the grid which at the moment burns, which, due to the arc, assumes a potential which diverges very slightly from the potential of the cathode. A high ohmic resistor is usually connected between the neutral point of the grid system and the cathode of the converter in order to define the potential of the grid during no load conditions.

The invention is, in the following, described further, with reference to the enclosed drawing. In the drawing FIGURE 1 is a current-voltage diagram which shows the under-critical operation range. FIGURE 2 shows one embodiment of the invention with two rectifiers working in parallel upon a direct current network. FIGURE 3 shows in principle a floating grid system of a commutating group of discharge paths with three anodes.

FIGURE 1 shows the relationship between the direct voltage D and the direct current I in percent of their rated values. When the direct current has decreased to 0.5 or 1% the above mentioned limit for the excitation of the inter-phase transformers is reached and due to the fact that at this stage, commutation will take place between anodes which are normally separated by inter-phase transformers, a voltage increase will occur so that the voltage, for instance as shown in the figure, rises to 115% of the rated voltage at no-load. The diagram also shows that the direct voltage system has an internal voltage drop which gives a slightly falling voltage characteristic so that rated current is reached at a voltage which is some percent lower than the no-load voltage.

FIGURE 2 shows a direct voltage system consisting of two rectifiers one of which has its gas-filled rectifier 1 connected to two three phase groups 2 and 3 with star connected secondary windings 4 and 5 of a rectifier transformer 6. The neutral point of the secondary windings are inter-connected through an inter-phase transformer 7. The primary windings of the transformer 6 are, through the terminals 8, connected to an alternaing current source. The cathode of the gas-filled rectifier 1, is connected to one bar 10 in the direct voltage system, through a conductor 9. The other bar 11 is connected through a smoothing reactor 12 to the central point of the inter-phase transformer 7. The grids 13 and 14 of the gas-filled rectifier are connected to a grid voltage device 15 which may be of conventional type. The schematic symbol shows, by way of example, that the device comprises two separate groups of secondary windings. These are connected to one of the grid groups 13 and 14 each, in such a way that a floating grid system is obtained. The grid voltage device 15 is connected to a blocking device 16 which consists of a transductor amplifier 17 which, in series with a metal rectifier 18, is connected to an alternating voltage source at the terminals 19. The current through the metal rectifier 18 produces the necessary blocking voltage across a resistor 20 which is connected in parallel with the smoothing capacitor 21. The transductor amplifier 17 is self-excited and has three control windings. A first control winding 22 is connected to the direct voltage of the system between the bars 10 and 11. A second control winding 23 is connected through a rectifier 24, consisting of a transformer 25 and a metal rectifier 26, to the alternating voltage of the rectifier transformer 6.

In order to explain the blocking operation reference is made to FIGURE 3 which shows the grid supply of a three pulse group according to the floating system. The grids of the three anodes 35, 36, and 37 are connected to one phase each of the secondary winding 38 of the grid voltage transformer, through grid resistors $R_g$. The neutral point of the winding is connected to the cathode 39 of the gas-filled rectifier through a resistor $R_0$, which has to be considerably larger than $R_g$, and through the blocking device 16.

The resulting grid voltage of an unburning grid can be influenced by the voltage $E_0$ if the current which is produced by $E_0$ causes a voltage drop across $R_g$. It can be shown mathematically that if $R_0$ is considerably larger than $R_g$, $E_0$ must be considerably larger than the secondary phase voltage $E_g$ of the grid voltage transformer. If the rectifier emits a current which is larger than the critical one and a negative potential has to be supplied to the grid of an unburning anode and if the value of $R_0$ is assumed to be only $10R_g$, it is necessary that $E_0$ is about $30E_g$.

If, on the other hand, the resulting current from the three anodes passes through zero, such a change in the voltage drop caused by the grid current, is caused, that a considerably lower value of $E_0$ is necessary in order to block the anodes. In such a case $E_0$ only has to exceed $\sqrt{2E_g}$.

If the load current in a direct voltage system, according to the invention, decreases to its critical value, a blocking voltage of the approximate size $\sqrt{2E_g}$ can be supplied to the grid circuit of the rectifier after which the three pulse group, the current of which first passes through zero, will become blocked. As a result a voltage increase is prevented, as the remaining three pulse group of the rectifier continues to emit current and gives the same direct voltage value as the total converter during normal service.

A grid system of the floating type has the advantage that the necessary blocking voltage can be supplied to the neutral point of the grid voltage transformer after which blocking is performed when the current of one commutating group passes through zero. In other types of grid systems it is necessary to have a device which indicates when the current of the rectifier passes through zero and at this moment performs the blocking.

The two control windings 22 and 23 in FIGURE 2 are in themselves sufficient to procure the desired result. The control windings can be so arranged that their number of ampere turns balance each other at a certain point upon the characteristic curve of the transductor 17 above which the transductor produces the necessary blocking voltage. If the rectifier operates within its undercritical range, the number of ampere turns of the winding 22 becomes larger than the ampere turns of the windings 23 and one commutating group will be blocked. As soon as the load of the system increases again the direct voltage decreases and the blocked group is deblocked.

In order to prevent repeated blocking and deblocking which is possible under certain load conditions the transductor 17 is provided with a third control winding 27 which is connected to a device sensitive to the current of the rectifier 1. The device 28 shown in FIGURE 2 is an example of a suitable circuit which consists of a measuring transductor 29, connected for indicating the minimum current, whereby the output voltage of the device is dependent on the current, only within a very narrow range close to zero. The device consists fundamentally of a bridge circuit in which two branches consist of one half each of a resistor 30 and the two other branches consist of one each of the series connected windings of the measuring transductor 29. Alternating voltage is supplied from the terminals 31 to one diagonal of the bridge and a metal rectifier 32 is connected to the other diagonal. This metal rectifier 32 has an output voltage which is substantially constant until the direct current through the measuring transductor sinks to a value close to zero when the output voltage from the metal rectifier will decrease quickly.

The control winding 27 is so arranged that its number of ampere turns co-operate with that of the winding 23 and the strength of the control winding 27 is so dimensioned that blocking is achieved at the critical load current, whereas the blocking is achieved first when the direct voltage is somewhat lower than the normal no-load voltage.

FIGURE 2 shows the described rectifier and another rectifier 33 which is connected in parallel with the first mentioned one, to the bars 10 and 11. The rectifier 33 is assumed to be provided with a blocking device of the described type whereby it is possible that the rectifiers are successively blocked when the load decreases and deblocked when their co-operation becomes necessary.

In order that at least one three phase group shall remain in operation and not become blocked, the current from the last unblocked remaining three phase group cannot be allowed to pass through zero and it may consequently be necessary to connect a basic load resistor 34 between the bars 10 and 11. Instead of a basic load resistor the direct voltage influenced control windings in the transductors in the blocking device 16 can be so dimensioned that they can constitute the desired basic load.

Instead of providing the transductor with a current sensitive control winding so that the rectifiers are deblocked at a voltage which is somewhat lower than the no-load voltage, the transductor may, in the event that it is provided with two voltage sensitive control windings, be labilly self-excited and so dimensioned that a blocking voltage is produced at a direct voltage which is somewhat higher than the critical voltage and that the rectifiers are deblocked at a direct voltage which is somewhat lower than said first mentioned voltage.

What I claim is:
1. A rectifier station fed from an A.C. network and feeding a D.C. network; said rectifier station comprising groups of commutating discharge paths, each including grid controlled rectifier means, said groups being displaced in phase in relation to each other, an inter-phase transformer interconnecting said groups, the pulse number of each of said groups being at least two and means sensitive to the voltage of said D.C. network and of said A.C. network for influencing the grid voltage of said rectifier means, when said D.C. voltage at undercritical load exceeds the ideal no-load D.C. voltage so as to block those of said commutating groups the current of which first temporarily becomes zero.

2. A direct voltage system as claimed in claim 1, in which said means for blocking said commutating groups are so arranged that said blocked commutating groups are deblocked when the direct voltage of the system at over-critical load becomes lower than the ideal no-load value.

3. A direct voltage system as claimed in claim 1, in which said rectifiers have floating grids and a blocking voltage is supplied to the grid circuit of each commutating group in such a way that those commutating groups are blocked, the current of which temporarily becomes zero.

4. A direct voltage system as claimed in claim 1, in which said means for blocking said commutating groups comprises an amplifier comprising a transductor having a first control winding, influenced by a current proportional to the direct voltage of the rectifier and a second control winding influenced by a current proportional to the mean value of the alternating voltage of a commutating group said transductor producing necessary blocking voltage when the number of ampere turns of said first control winding is equal to or larger than the number of ampere turns of said second control winding.

5. A direct voltage system as claimed in claim 4, in which said transductor amplifier is labilly self-excited in such a way that a blocking voltage is produced when the direct voltage of the rectifier exceeds a certain value and that said blocking voltage vanishes when said direct voltage falls below a value lower than said first value at which it was produced.

6. A direct voltage system as claimed in claim 4, in which said transductor has a third control winding influenced by a current proportional to the direct current of the rectifier, and said transductor produces necessary blocking voltage when the number of ampere turns of said first control winding is larger than the sum of the number of ampere turns of said second and said third control windings.

7. A direct voltage system as claimed in claim 6, comprising a current sensitive means feeding said third control winding, the output voltage of said current sensitive means being dependent on the direct current of the rectifier only when said current is close to zero.

8. A direct voltage system as claimed in claim 1, comprising a load connected to the system, said load having such a value that the direct current from one remaining unblocked commutating group is larger than zero at every moment.

9. A direct voltage system as claimed in claim 8, in which said load consists of transductor control windings.

10. A direct voltage system, fed from grid controlled rectifiers, and comprising commutating groups of discharge paths displaced in phase in relation to each other and each having at least the pulse number 2, an interphase transformer, a source of alternating current, means connecting said transformer to said source of alternating current, means interconnecting said discharge paths through said transformer, and means sensitive to the direct voltage and to the alternating voltage of the system for blocking those only of said commutating groups the current of which at under-critical load first becomes zero when said direct current voltage exceeds its ideal no-load value.

References Cited in the file of this patent

UNITED STATES PATENTS

| | | |
|---|---|---|
| 2,186,244 | Hartel | Jan. 9, 1940 |
| 2,291,349 | Schmidt | July 28, 1942 |
| 2,331,643 | Winograd | Oct. 12, 1943 |
| 2,394,013 | Rose | Feb. 5, 1946 |
| 2,550,115 | Geiselman | Apr. 24, 1951 |
| 2,775,732 | Winograd | Dec. 25, 1956 |